United States Patent
Ando

(10) Patent No.: US 8,032,289 B2
(45) Date of Patent: Oct. 4, 2011

(54) POWER OUTPUT APPARATUS, INTERNAL COMBUSTION ENGINE SYSTEM, AND CONTROL METHODS THEREOF

(75) Inventor: Ikuo Ando, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 12/444,422

(22) PCT Filed: Aug. 24, 2007

(86) PCT No.: PCT/JP2007/066410
§ 371 (c)(1),
(2), (4) Date: Apr. 6, 2009

(87) PCT Pub. No.: WO2008/050531
PCT Pub. Date: May 2, 2008

(65) Prior Publication Data
US 2010/0036589 A1    Feb. 11, 2010

(30) Foreign Application Priority Data
Oct. 27, 2006   (JP) .................................. 2006-292290

(51) Int. Cl.
*B60T 7/12* (2006.01)
(52) U.S. Cl. .................... 701/103; 701/112; 701/113
(58) Field of Classification Search .......... 701/103–105, 701/112, 113
See application file for complete search history.

(56) References Cited

U.S. PATENT DOCUMENTS

| | | | | |
|---|---|---|---|---|
| 5,438,967 | A * | 8/1995 | Ito | 123/339.12 |
| 6,823,827 | B2 * | 11/2004 | Sugiura et al. | 123/179.4 |
| 7,398,148 | B2 * | 7/2008 | Yoshioka et al. | 701/103 |
| 7,721,833 | B2 * | 5/2010 | Kikuchi | 180/65.28 |
| 2007/0185629 | A1 * | 8/2007 | Kikuchi | 701/22 |
| 2007/0250250 | A1 * | 10/2007 | Yoshioka et al. | 701/104 |

FOREIGN PATENT DOCUMENTS

| | | |
|---|---|---|
| JP | 06-036266 Y2 | 9/1994 |
| JP | 2005-337059 A | 12/2005 |
| JP | 2006-029323 A | 2/2006 |
| JP | 2007-113507 A | 5/2007 |

* cited by examiner

*Primary Examiner* — John Kwon
(74) *Attorney, Agent, or Firm* — Kenyon & Kenyon LLP

(57) ABSTRACT

On the occasion of a cutoff of fuel supply to an engine in an accelerator-off state, the invention expands a throttle opening over a specific throttle opening set in the state of idling of the engine at the reference rotation speed. On resumption of fuel injection to the engine, the invention reduces the throttle opening to the specific throttle opening set in the state of idling of the engine at the reference rotation speed. Under no control of lowering the rotation speed of the engine by a motor or under the condition of low vehicle speed with control of lowering the rotation speed of the engine by the motor, the invention resumes fuel injection to the engine resumed with setting of a smaller correction amount to a fuel increase correction amount.

7 Claims, 7 Drawing Sheets

_US 8,032,289 B2_

POWER OUTPUT APPARATUS, INTERNAL COMBUSTION ENGINE SYSTEM, AND CONTROL METHODS THEREOF

This is a 371 national phase application of PCT/JP2007/066410 filed 24 Aug. 2007, claiming priority to Japanese Patent Application No. JP 2006-292290 filed 27 Oct. 2006, the contents of which are incorporated herein by reference.

TECHNICAL FIELD

The present invention relates to a power output apparatus, an internal combustion engine system, and their control methods. More specifically the invention pertains to a power output apparatus constructed to output power to a driveshaft, an internal combustion engine system including an internal combustion engine equipped with a catalytic converter using a catalyst of high oxygen storage capacity to purify the exhaust gas, and control methods of such a power output apparatus and such an internal combustion engine system.

BACKGROUND ART

One proposed technique for a vehicle equipped with such a power output apparatus increases the amount of intake air in the state of a cutoff of fuel supply to an engine during deceleration, with a view to reducing the potential smell of a catalyst (see, for example, Patent Document 1). The smell of the catalyst is given by release of hydrogen sulfide converted from sulfur oxides carried on a catalyst, which is used to reduce the toxicity of exhaust gas, in the condition of insufficient amount of oxygen. The catalyst is generally deteriorated by introduction of a large amount of the air in a high temperature condition. The prior art vehicle of the above proposed technique decreases the amount of intake air to the engine below a reference air amount adopted in an engine idling condition at the vehicle speed of not lower than a first vehicle speed in order to prevent deterioration of the catalyst, while increasing the amount of intake air to the engine above the reference air amount adopted in the engine idling condition at the vehicle speed of lower than the first vehicle speed in order to reduce the potential smell of the catalyst.
Patent Document 1: Japanese Patent Laid-Open No. 2006-29323

DISCLOSURE OF THE INVENTION

On resumption of fuel supply to the engine after a cutoff of the fuel supply to the engine during deceleration, for the good startability of the engine, the amount of the fuel supply is increased to have a greater fuel fraction than that of a stoichiometric air-fuel ratio. Resumption of the fuel injection with the increased amount of the fuel supply than that of the stoichiometric air-fuel ratio in combination with the increased amount of the intake air for reduction of the potential smell of the catalyst may cause the phenomenon of after-fire, that is, explosive combustion of the fuel in the exhaust pipe, since a sufficient amount of the air is present in the exhaust pipe.

In the power output apparatus, the internal combustion engine system, and their control methods, there would thus be a demand for reducing the potential smell given, at the time of a cutoff of fuel supply, by a catalyst used to reduce the toxicity of exhaust gas from an internal combustion engine, while preventing the potential after-fire from occurring on a return from the cutoff of the fuel supply (on resumption of fuel injection).

The present invention accomplishes at least part of the demand mentioned above and the other relevant demands by the following configurations applied to the power output apparatus, the internal combustion engine system, and their control methods.

According to one aspect, the present invention is directed to a first power output apparatus constructed to output power to a driveshaft. The first power output apparatus has: an internal combustion engine connected with the driveshaft in such a manner as to be rotatable independently of the driveshaft and to transmit part of an output power to the driveshaft and equipped with a catalytic converter that is filled with a catalyst having high oxygen storage capacity to reduce the toxicity of exhaust gas; a rotation speed adjustment structure designed to adjust a rotation speed of an output shaft of the internal combustion engine; an accelerator-off detector designed to detect an accelerator-off state; and a controller. Under active rotation speed reduction control that controls the internal combustion engine and the rotation speed adjustment structure to lower the rotation speed of the output shaft of the internal combustion engine in the accelerator-off state detected by the accelerator-off detector, the controller controls the internal combustion engine to stop fuel injection to the internal combustion engine and to increase an amount of intake air to the internal combustion engine. On resumption of the fuel injection to the internal combustion engine after stopping the fuel injection, the controller controls the internal combustion engine to resume the fuel injection to the internal combustion engine with a resumption-time fuel injection amount, which is increased from a standard fuel injection amount in a steady operation of the internal combustion engine relative to the amount of intake air to the internal combustion engine. Under passive rotation speed reduction control that controls the internal combustion engine and the rotation speed adjustment structure to lower the rotation speed of the output shaft of the internal combustion engine without adjustment of the rotation speed of the output shaft of the internal combustion engine by the rotation speed adjustment structure in the accelerator-off state detected by the accelerator-off detector, the controller controls the internal combustion engine to stop the fuel injection to the internal combustion engine and to increase the amount of intake air to the internal combustion engine. On resumption of the fuel injection to the internal combustion engine after stopping the fuel injection, the controller controls the internal combustion engine to resume the fuel injection to the internal combustion engine with a smaller fuel injection amount than the resumption-time fuel injection amount.

Under the active rotation speed reduction control that controls the internal combustion engine and the rotation speed adjustment structure to lower the rotation speed of the output shaft of the internal combustion engine in the accelerator-off state, the first power output apparatus according to this aspect of the invention controls the internal combustion engine to stop the fuel injection to the internal combustion engine and to increase the amount of intake air to the internal combustion engine. Such engine control effectively reduces the potential smell given by the catalyst. On resumption of the fuel injection to the internal combustion engine after the active rotation speed reduction control, the first power output apparatus controls the internal combustion engine to resume the fuel injection to the internal combustion engine with the resumption-time fuel injection amount, which is increased from the standard fuel injection amount in the steady operation of the internal combustion engine relative to the amount of intake air to the internal combustion engine. The control of the rotation speed adjustment structure promptly lowers the rotation speed of the internal combustion engine and thereby decreases the amount of the air in an exhaust pipe, compared with the case of no such adjustment of the rotation speed. The decreased amount of the air in the exhaust pipe desirably reduces the potential for the occurrence of after-fire even in the case of fuel injection with the resumption-time fuel injection amount that is greater than the standard fuel injection amount adopted in the steady operation of the internal combustion engine for the good startability of the internal combustion engine. Under the passive rotation speed reduction control that controls the internal combustion engine and the rotation speed adjustment structure to lower the rotation speed of the output shaft of the internal combustion engine without adjustment of the rotation speed of the output shaft of the internal combustion engine by the rotation speed adjustment structure in the accelerator-off state, on the other hand, the first power output apparatus controls the internal combustion engine to stop the fuel injection to the internal combustion engine and to increase the amount of intake air to the internal combustion engine. Such engine control in the passive rotation speed reduction control also effectively reduces the potential smell given by the catalyst, as in the engine control under the active rotation speed reduction control. On resumption of the fuel injection to the internal combustion engine after the passive rotation speed reduction control, the first power output apparatus controls the internal combustion engine to resume the fuel injection to the internal combustion engine with the smaller fuel injection amount than the resumption-time fuel injection amount. In the condition without the adjustment of the rotation speed of the output shaft of the internal combustion engine by the rotation speed adjustment structure, it is assumed that an excess amount of the air is present in the exhaust pipe. The resumption of the fuel injection to the internal combustion engine with the smaller fuel injection amount than the resumption-time fuel injection amount effectively prevents the occurrence of potential after-fire.

In one preferable embodiment of the invention, the first power output apparatus of the above aspect further has a rotation speed-reflecting physical amount detector designed to detect a physical amount reflecting a rotation speed of the driveshaft as a rotation-speed reflecting physical amount. When the detected rotation speed-reflecting physical amount is not lower than a preset reference physical amount, on resumption of the fuel injection to the internal combustion engine even after the passive rotation speed reduction control, the controller controls the internal combustion engine to resume the fuel injection to the internal combustion engine with the resumption-time fuel injection amount. The detected rotation speed-reflecting physical amount of not lower than the preset reference physical amount is equivalent to the condition of a relatively high rotation speed of the driveshaft. At the relatively high rotation speed of the driveshaft, even under the passive rotation speed reduction control, the fuel injection to the internal combustion engine is resumed with the resumption-time fuel injection amount. This arrangement ensures a quick start of the internal combustion engine and thereby enables a required power to be output to the driveshaft with the output power from the internal combustion engine.

In one preferable application of the first power output apparatus according to the above aspect of the invention, prior to resumption of the fuel injection to the internal combustion engine, the controller controls the internal combustion engine to reduce the amount of intake air to the internal combustion engine. This arrangement decreases the amount of the air in the exhaust pipe and more effectively prevents the occurrence of potential after-fire.

In one preferable embodiment of the invention, the first power output apparatus further includes a motor arranged to input and output power from and to the driveshaft; a braking force application structure constructed to apply a braking force to the driveshaft; and a driving force demand setting module configured to set a driving force demand required for the driveshaft, and the controller controls the motor and the braking force application structure to output a driving force equivalent to the set driving force demand to the driveshaft. This arrangement ensures output of a driving force corresponding to the driving force demand to the drive shaft.

In another preferable embodiment of the first power output apparatus of the invention, the rotation speed adjustment structure is connected with the driveshaft and with the output shaft of the internal combustion engine to be rotatable independently of the driveshaft and outputs a torque to the output shaft of the internal combustion engine accompanied with output of a torque as a reactive force to the driveshaft, so as to adjust the rotation speed of the output shaft of the internal combustion engine. In this case, the rotation speed adjustment structure may include: a three shaft-type power input output structure connected to three shafts, the driveshaft, the output shaft of the internal combustion engine, and a third shaft, and designed to input and output power to a residual shaft based on powers input from and output to any two shafts among the three shafts; and a generator arranged to input and output power from and to the third shaft. Otherwise, the rotation speed adjustment structure may include: a pair-rotor motor configured to have a first rotor connected with the output shaft of the internal combustion engine and a second rotor connected with the driveshaft and to rotate by relative rotation of the first rotor to the second rotor.

According to another aspect, the present invention is directed to an internal combustion engine system including an internal combustion engine equipped with a catalytic converter that is filled with a catalyst having high oxygen storage capacity to reduce the toxicity of exhaust gas, the internal combustion engine system including: an accelerator-off detector designed to detect an accelerator-off state; and a controller configured to control the internal combustion engine to stop fuel injection to the internal combustion engine and to increase an amount of intake air to the internal combustion engine in the accelerator-off state detected by the accelerator-off detector, on resumption of the fuel injection to the internal combustion engine, the controller controlling the internal combustion engine to resume the fuel injection to the internal combustion engine after reduction of the amount of intake air to the internal combustion engine.

In the accelerator-off state, the internal combustion engine system according to this aspect of the invention controls the internal combustion engine to stop the fuel injection to the internal combustion engine and to increase the amount of intake air to the internal combustion engine. Such engine control effectively reduces the potential smell given by the catalyst. On resumption of the fuel injection to the internal combustion engine, the system controls the internal combustion engine to resume the fuel injection to the internal combustion engine after reduction of the amount of intake air to the internal combustion engine. Such engine control decreases amount of the air in the exhaust pipe and desirably reduces the potential for the occurrence of after-fire.

According to another aspect, the present invention is directed to a second power output apparatus constructed to output power to a driveshaft. The second power output apparatus has: an internal combustion engine equipped with a catalytic converter that is filled with a catalyst having high oxygen storage capacity to reduce the toxicity of exhaust gas;

a rotation speed adjustment structure designed to adjust a rotation speed of an output shaft of the internal combustion engine accompanied with output of a torque as a reactive force to the driveshaft; an accelerator-off detector designed to detect an accelerator-off state; and a controller configured to control the internal combustion engine to stop fuel injection to the internal combustion engine and to increase an amount of intake air to the internal combustion engine in the accelerator-off state detected by the accelerator-off detector, and, on resumption of the fuel injection to the internal combustion engine, to control the internal combustion engine to resume the fuel injection to the internal combustion engine after reduction of the amount of intake air to the internal combustion engine.

In the accelerator-off state, the second power output apparatus according to this aspect of the invention controls the internal combustion engine to stop the fuel injection to the internal combustion engine and to increase the amount of intake air to the internal combustion engine. This arrangement effectively reduces the potential smell given by the catalyst. On resumption of the fuel injection to the internal combustion engine, the second power output apparatus controls the internal combustion engine to resume the fuel injection to the internal combustion engine after reduction of the amount of intake air to the internal combustion engine. This arrangement decreases the amount of the air in the exhaust pipe on resumption of the fuel injection to the internal combustion engine and thus effectively prevents the occurrence of potential after-fire.

In one preferable embodiment, the second power output apparatus further includes: a motor arranged to input and output power from and to the driveshaft; a braking force application structure constructed to apply a braking force to the driveshaft; and a driving force demand setting module configured to set a driving force demand required for the driveshaft, and the controller controls the motor and the braking force application structure to output a driving force equivalent to the set driving force demand to the driveshaft. This arrangement ensures output of a driving force corresponding to the driving force demand to the drive shaft.

In another preferable embodiment of the second power output apparatus of the invention, the rotation speed adjustment structure is connected with the driveshaft and with the output shaft of the internal combustion engine to be rotatable independently of the driveshaft and outputs a torque to the output shaft of the internal combustion engine accompanied with output of a torque as a reactive force to the driveshaft, so as to adjust the rotation speed of the output shaft of the internal combustion engine. In this case, the rotation speed adjustment structure may include: a three shaft-type power input output structure connected to three shafts, the driveshaft, the output shaft of the internal combustion engine, and a third shaft, and designed to input and output power to a residual shaft based on powers input from and output to any two shafts among the three shafts; and a generator arranged to input and output power from and to the third shaft. Otherwise, the rotation speed adjustment structure may include: a pair-rotor motor configured to have a first rotor connected with the output shaft of the internal combustion engine and a second rotor connected with the driveshaft and to rotate by relative rotation of the first rotor to the second rotor.

The first and second power output apparatuses of the invention may be mounted on a vehicle. In this case, the axle of the vehicle is connected to the driveshaft.

According to anther aspect, the present invention is directed to a control method of a power output apparatus that is constructed to output power to a driveshaft and includes: an internal combustion engine connected with the driveshaft in such a manner as to be rotatable independently of the driveshaft and to transmit part of an output power to the driveshaft and equipped with a catalytic converter that is filled with a catalyst having high oxygen storage capacity to reduce the toxicity of exhaust gas; and a rotation speed adjustment structure designed to adjust a rotation speed of an output shaft of the internal combustion engine. The control method including the steps of: under active rotation speed reduction control that controls the internal combustion engine and the rotation speed adjustment structure to lower the rotation speed of the output shaft of the internal combustion engine in an accelerator-off state, controlling the internal combustion engine to stop fuel injection to the internal combustion engine and to increase an amount of intake air to the internal combustion engine, and on resumption of the fuel injection to the internal combustion engine after the active rotation speed reduction control, controlling the internal combustion engine to resume the fuel injection to the internal combustion engine with a resumption-time fuel injection amount, which is increased from a standard fuel injection amount in a steady operation of the internal combustion engine relative to the amount of intake air to the internal combustion engine, while under passive rotation speed reduction control that controls the internal combustion engine and the rotation speed adjustment structure to lower the rotation speed of the output shaft of the internal combustion engine without adjustment of the rotation speed of the output shaft of the internal combustion engine by the rotation speed adjustment structure in the accelerator-off state, controlling the internal combustion engine to stop the fuel injection to the internal combustion engine and to increase the amount of intake air to the internal combustion engine, and on resumption of the fuel injection to the internal combustion engine after the passive rotation speed reduction control, controlling the internal combustion engine to resume the fuel injection to the internal combustion engine with a smaller fuel injection amount than the resumption-time fuel injection amount.

Under the active rotation speed reduction control that controls the internal combustion engine and the rotation speed adjustment structure to lower the rotation speed of the output shaft of the internal combustion engine in the accelerator-off state, the control method according to this aspect of the invention controls the internal combustion engine to stop the fuel injection to the internal combustion engine and to increase the amount of intake air to the internal combustion engine. Such engine control effectively reduces the potential smell given by the catalyst. On resumption of the fuel injection to the internal combustion engine after the active rotation speed reduction control, the control method controls the internal combustion engine to resume the fuel injection to the internal combustion engine with the resumption-time fuel injection amount, which is increased from the standard fuel injection amount in the steady operation of the internal combustion engine relative to the amount of intake air to the internal combustion engine. The control of the rotation speed adjustment structure promptly lowers the rotation speed of the internal combustion engine and thereby decreases the amount of the air in an exhaust pipe, compared with the case of no such adjustment of the rotation speed. The decreased amount of the air in the exhaust pipe desirably reduces the potential for the occurrence of after-fire even in the case of fuel injection with the resumption-time fuel injection amount that is greater than the standard fuel injection amount adopted in the steady operation of the internal combustion engine for the good startability of the internal combustion engine. Under the passive rotation speed reduction control that controls the internal combustion engine and the rotation speed adjustment structure to lower the rotation speed of the output shaft of the internal combustion engine without adjustment of the rotation speed of the output shaft of the internal combustion engine by the rotation speed adjustment structure in the accelerator-off state, on the other hand, the control method controls the internal combustion engine to stop the fuel injection to the internal combustion engine and to increase the amount of intake air to the internal combustion engine. Such engine control in the passive rotation speed reduction control also effectively reduces the potential smell given by the catalyst, as in the engine control under the active rotation speed reduction control. On resumption of the fuel injection to the internal combustion engine after the passive rotation speed reduction control, the control method controls the internal combustion engine to resume the fuel injection to the internal combustion engine with the smaller fuel injection amount than the resumption-time fuel injection amount. In the condition without the adjustment of the rotation speed of the output shaft of the internal combustion engine by the rotation speed adjustment structure, it is assumed that an excess amount of the air is present in the exhaust pipe. The resumption of the fuel injection to the internal combustion engine with the smaller fuel injection amount than the resumption-time fuel injection amount effectively prevents the occurrence of potential after-fire.

According to still another aspect, the present invention is directed to a control method of an internal combustion engine system including an internal combustion engine equipped with a catalytic converter that is filled with a catalyst having high oxygen storage capacity to reduce the toxicity of exhaust gas. The control method includes the steps of: controlling the internal combustion engine to stop fuel injection to the internal combustion engine and to increase an amount of intake air to the internal combustion engine in an accelerator-off state, and on resumption of the fuel injection to the internal combustion engine, controlling the internal combustion engine to resume the fuel injection to the internal combustion engine after reduction of the amount of intake air to the internal combustion engine.

In the accelerator-off state, the control method according to this aspect of the invention controls the internal combustion engine to stop the fuel injection to the internal combustion engine and to increase the amount of intake air to the internal combustion engine. Such engine control effectively reduces the potential smell given by the catalyst. On resumption of the fuel injection to the internal combustion engine, the control method controls the internal combustion engine to resume the fuel injection to the internal combustion engine after reduction of the amount of intake air to the internal combustion engine. Such engine control decreases amount of the air in the exhaust pipe and desirably reduces the potential for the occurrence of after-fire.

BEST MODES FOR CARRYING OUT THE INVENTION

Figure 1:
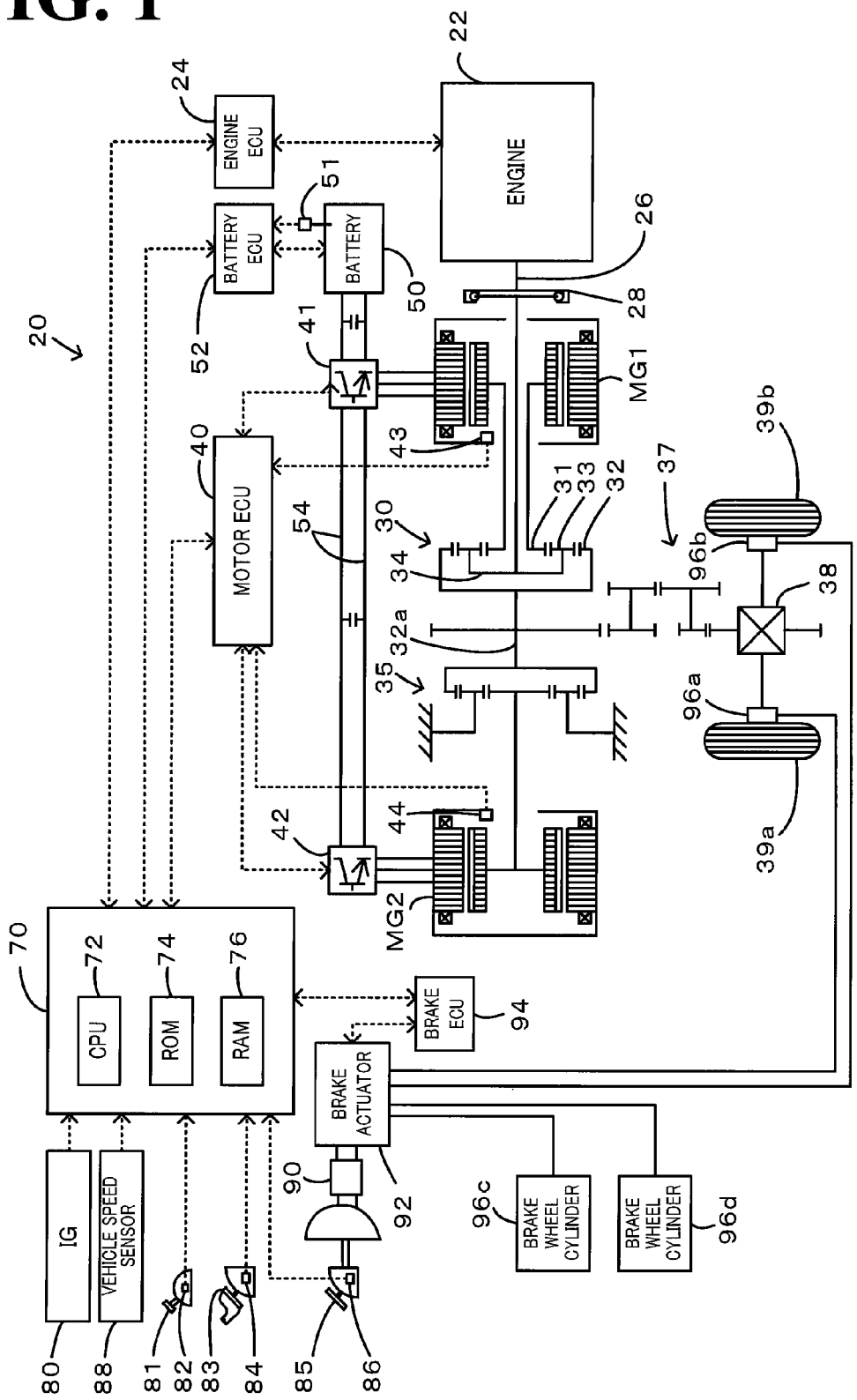
FIG. 1 schematically illustrates the configuration of a hybrid vehicle 20 in one embodiment of the invention.

One mode of carrying out the invention is described below as a preferred embodiment. FIG. 1 schematically illustrates the configuration of a hybrid vehicle 20 in one embodiment of the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, a brake actuator 92 configured to control brakes for drive wheels 39a and 39b and for driven wheels (not shown), and a hybrid electronic control unit 70 configured to control the whole driving system of the hybrid vehicle 20.

Figure 2:
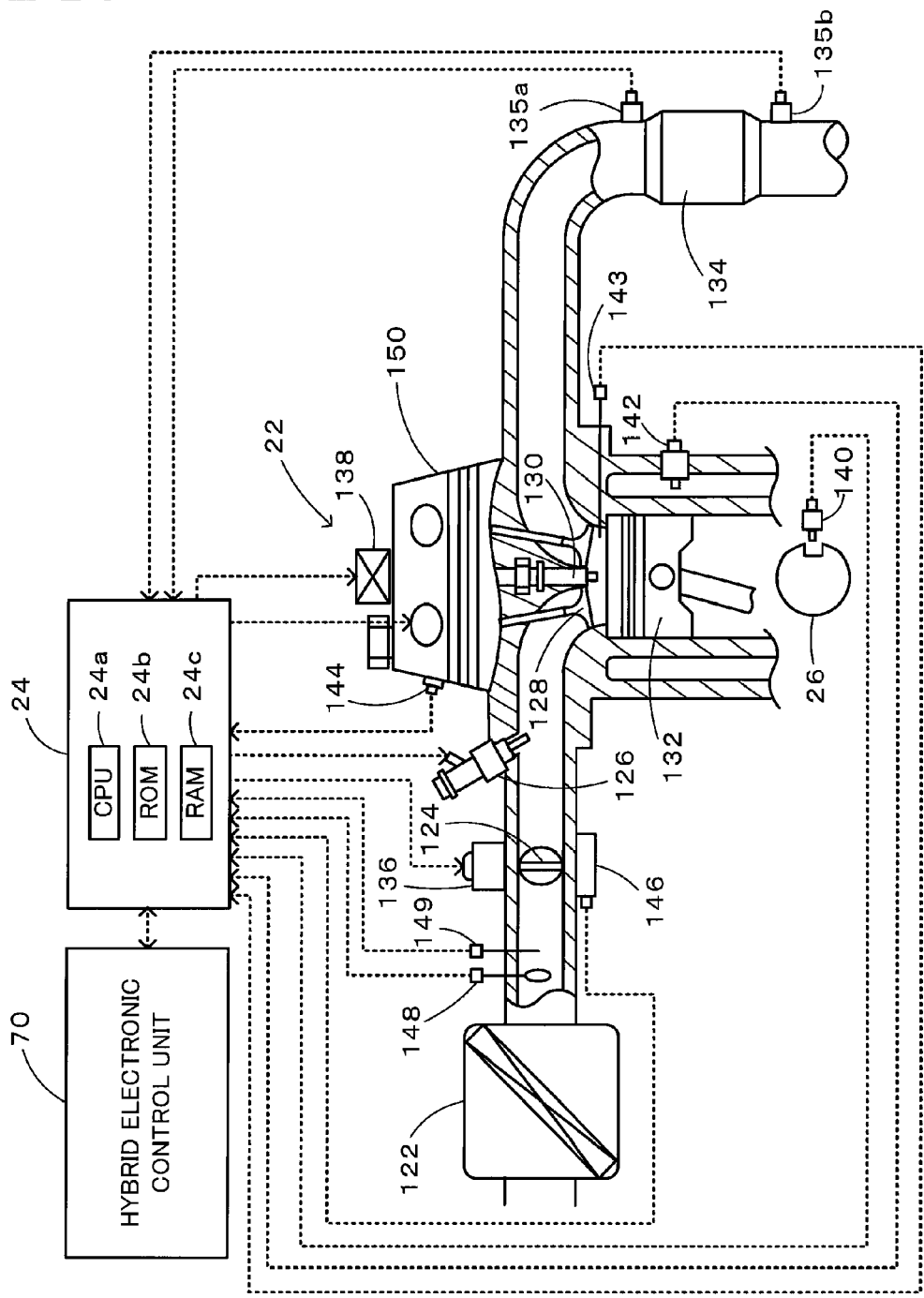
FIG. 2 schematically illustrates the configuration of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a catalytic conversion unit 134 filled with catalyst to convert toxic components included in the exhaust, that is, carbon monoxide (CO), hydrocarbons (HC), and nitrogen oxides (NOx), into harmless components, and is discharged to the outside air. In the embodiment, the catalytic conversion unit 134 is filled with three-way catalyst having high oxygen storage capability.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 23, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, an intake air temperature from a temperature sensor 149 attached to the air intake conduit, an air/fuel ratio AF from an air/fuel ratio sensor 135a, and an oxygen signal from an oxygen sensor 135b. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements. The engine ECU calculates a rotation speed of the crankshaft 26 or a rotation speed Ne of the engine 22 based on the crank position input from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, and the differential gear 38 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The brake actuator 92 is actuated to adjust the hydraulic pressures of brake wheel cylinders 96a through 96d and thereby apply a braking torque to the drive wheels 39a and 39b and to the driven wheels (not shown) as a brake share of a braking force to be applied to the vehicle by a vehicle speed V and a pressure of a brake master cylinder 90 (brake pressure) corresponding to the driver's depression of a brake pedal 85. The brake actuator 92 is also actuated to adjust the hydraulic pressures of the brake wheel cylinders 96a through 96d and thereby apply a braking torque to the drive wheels 39a and 39b and to the driven wheels, independently of the driver's depression of the brake pedal 85. In the description hereafter, application of the braking force to the drive wheels 39a and 39b and to the driven wheels (not shown) by actuation of the brake actuator 92 is referred to as hydraulic brake. The brake actuator 92 is under control of a brake electronic control unit (hereafter referred to as brake ECU) 94. The brake ECU 94 inputs signals representing wheel speeds from wheel speed sensors (not shown) attached to the drive wheels 39a and 39b and the driven wheels and a signal representing a steering angle from a steering angle sensor (not shown) via relevant signal lines (not shown). The brake ECU 94 has the function of an anti-lock braking system (ABS) to prevent any of the drive wheels 39a and 39b and the driven wheels from being locked to skid in response to the driver's depression of the brake pedal 85. The brake ECU 94 also performs traction control (TRC) to prevent either of the drive wheels 39a and 39b from being spun to skid in response to the driver's depression of the brake pedal 85, as well as vehicle stability control (VSC) to maintain the stability of the vehicle during a turn of the vehicle. The brake ECU 94 establishes communication with the hybrid electronic control unit 70 to actuate and control the brake actuator 92 in response to control signals from the hybrid electronic control unit 70 and to output data regarding the conditions of the brake actuator 92 to the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, the battery ECU 52, and the brake ECU 94, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
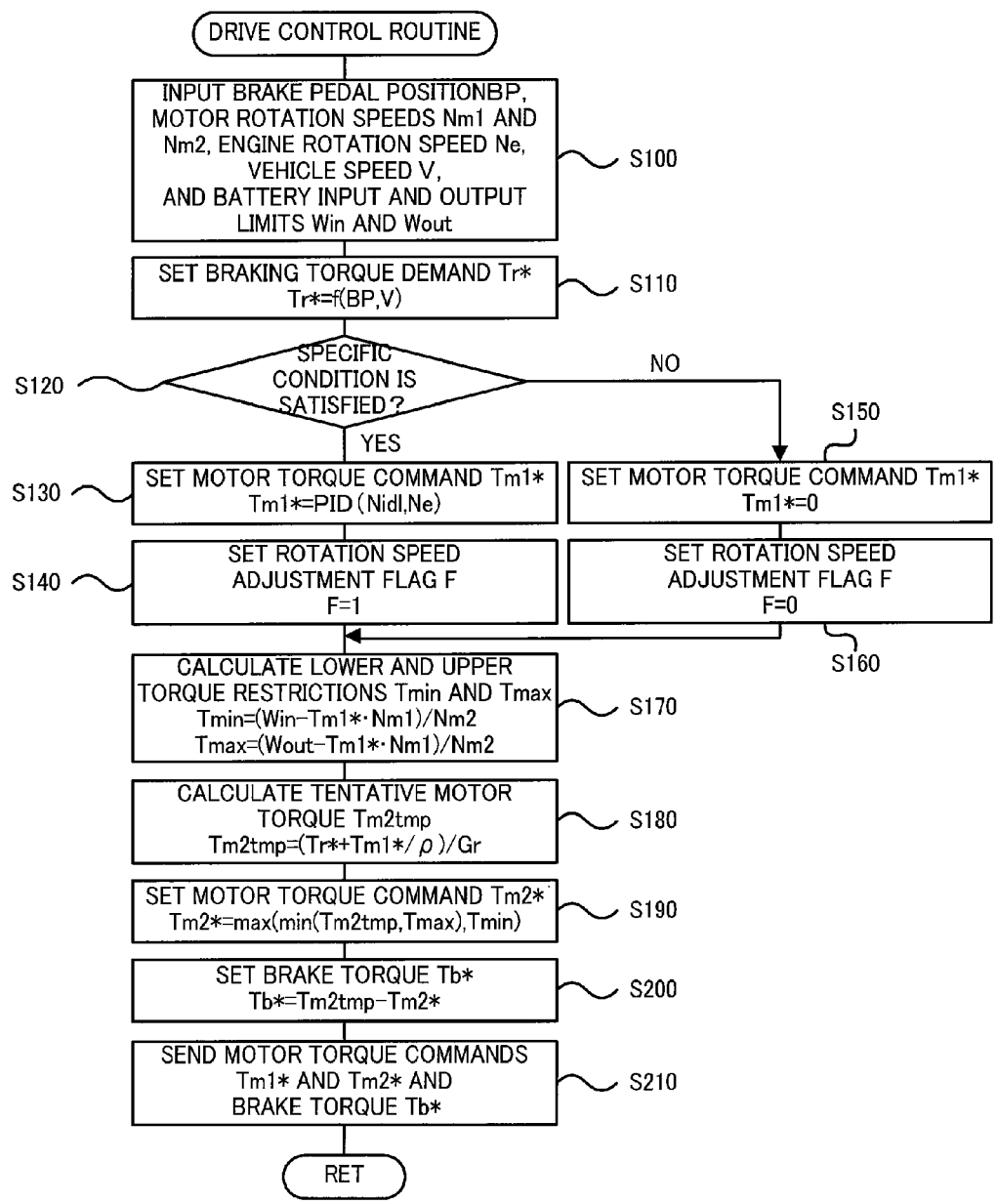
FIG. 3 is a flowchart showing a drive control routine executed by a hybrid electronic control unit 70 of the embodiment in an accelerator-off state.
Figure 4:
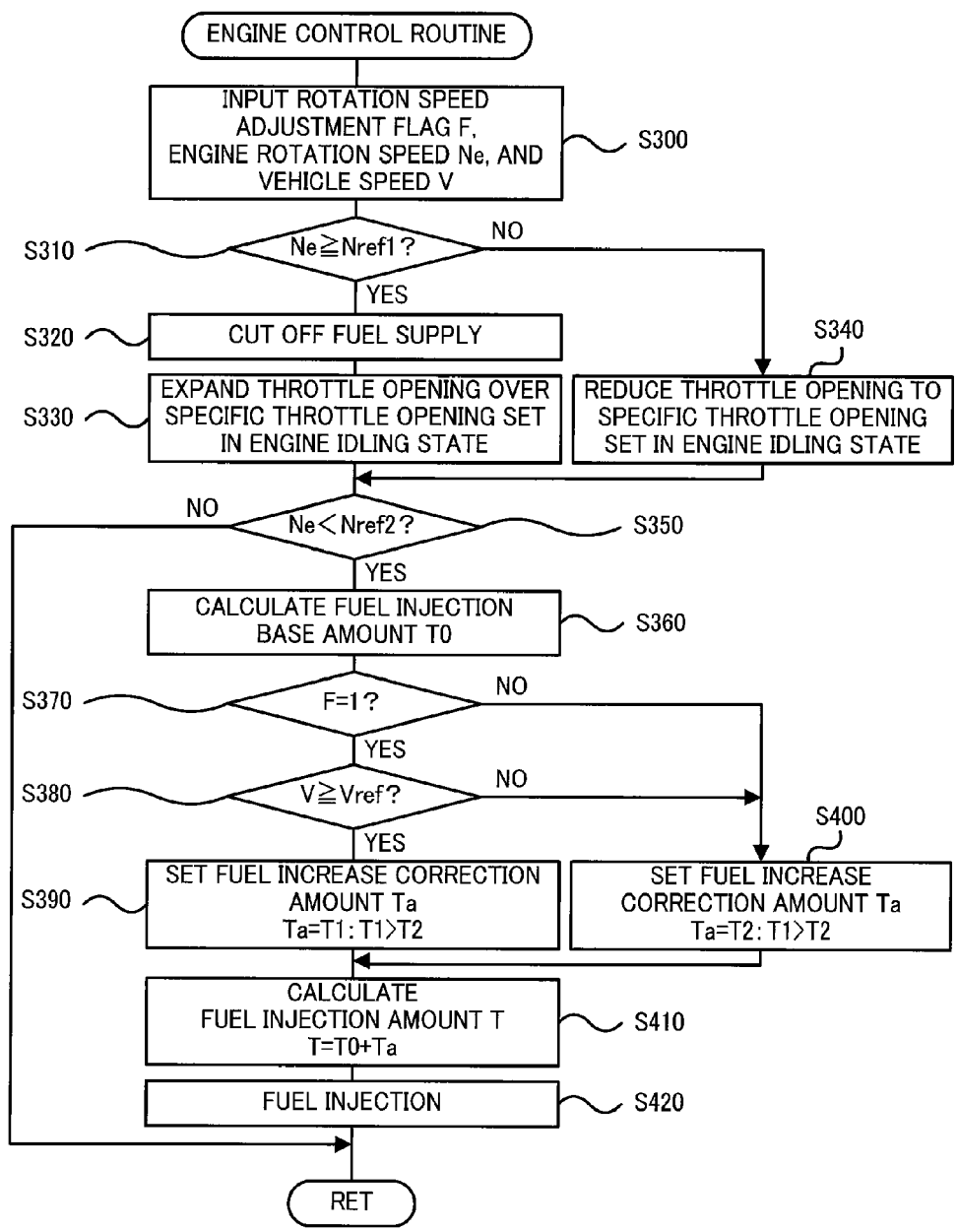
FIG. 4 is a flowchart showing an engine control routine executed by an engine ECU 24 of the embodiment in the accelerator-off state.

The following describes the operations of the hybrid vehicle 20 of the embodiment having the configuration discussed above, especially a series of operations in an accelerator-off state in response to the driver's release of the accelerator pedal 83. FIG. 3 is a drive control routine executed by the hybrid electronic control unit 70 in the accelerator-off state. FIG. 4 is a flowchart showing an engine control routine executed by the engine ECU 24 in the accelerator-off state. The drive control routine and the engine control routine are performed repeatedly at preset time intervals (for example, at every several msec). For convenience of explanation, the description is first about the drive control in the accelerator-off state according to the drive control routine of FIG. 3 and is then about the engine control in the accelerator-off state according to the engine control routine of FIG. 4.

In the drive control routine, the CPU 72 of the hybrid electronic control unit 70 first inputs various data required for control, for example, the brake pedal position BP from the brake pedal position sensor 86, the vehicle speed V from the vehicle speed sensor 88, rotation speeds Nm1 and Nm2 of the motors MG1 and MG2, the rotation speed Ne of the engine 22, and an input limit Win and an output limit Wout of the battery 50 (step S100). The rotation speed Ne of the engine 22 is computed from a signal of the crank position sensor attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 detected by the temperature sensor 51 and the state of charge (SOC) of the battery 50 and are received from the battery ECU 52 by communication.

Figure 5:
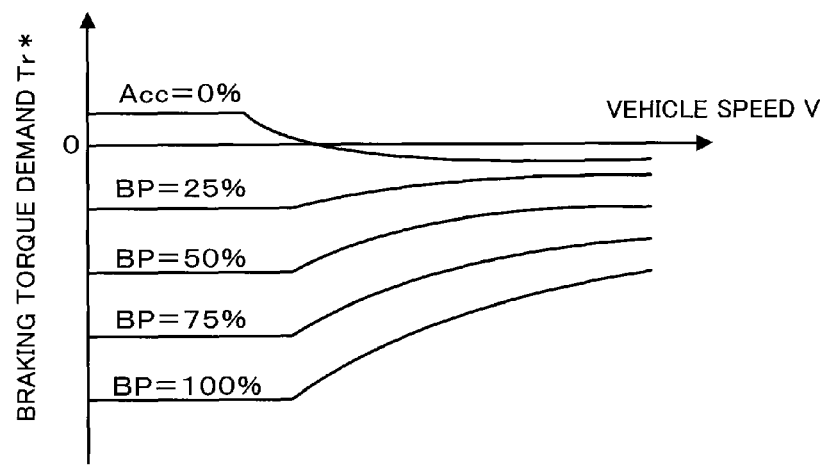
FIG. 5 shows one example of a braking torque demand setting map.

After the data input, a braking torque demand $Tr^*$ to be output to the ring gear shaft 32a or the driveshaft linked with the drive wheels 39a and 39b is set as a braking torque required for the vehicle, based on the input brake pedal position BP and the input vehicle speed V (step S110). A concrete procedure of setting the braking torque demand $Tr^*$ in this embodiment provides and stores in advance variations in braking torque demand $Tr^*$ against the vehicle speed V with regard to various settings of the brake pedal position BP as a braking torque demand setting map in the ROM 74 and reads the braking torque demand $Tr^*$ corresponding to the given brake pedal position BP and the given vehicle speed V from this stored map. One example of the braking torque demand setting map is shown in FIG. 5.

It is then determined whether a specific condition for lowering the rotation speed Ne of the engine 22 by the motor MG1 is satisfied or unsatisfied (step S120). The specific condition is, for example, that the brake pedal position BP represents the driver's brake application or that the state of charge (SOC) of the battery 50 is less than a preset reference level to have a sufficient margin for charge.

Upon satisfaction of the specific condition for lowering the rotation speed Ne of the engine 22 by the motor MG1, a torque command $Tm1^*$ of the motor MG1 is set according to a relational expression of feedback control given below as Equation (1), so as to make the rotation speed Ne of the engine 22 approach to an idle rotation speed Nid1 (for example, 1200 rpm) (step S130). A rotation speed adjustment flag F is then set to 1 (step S140). Upon dissatisfaction of the specific condition for lowering the rotation speed Ne of the engine 22 by the motor MG1, on the other hand, the torque command $Tm1^*$ of the motor MG1 is set to 0 (step S150). The rotation speed adjustment flag F is then reset to 0 (step S160). In Equation (1), 'k1' in the first term and 'k2' in the second term on the right side respectively denote a gain of the proportional and a gain of the integral term.

$$Tm1^* = k1(Nid1-Ne) + k2\int(Nid1-Ne)dt \qquad (1)$$

Figure 6:
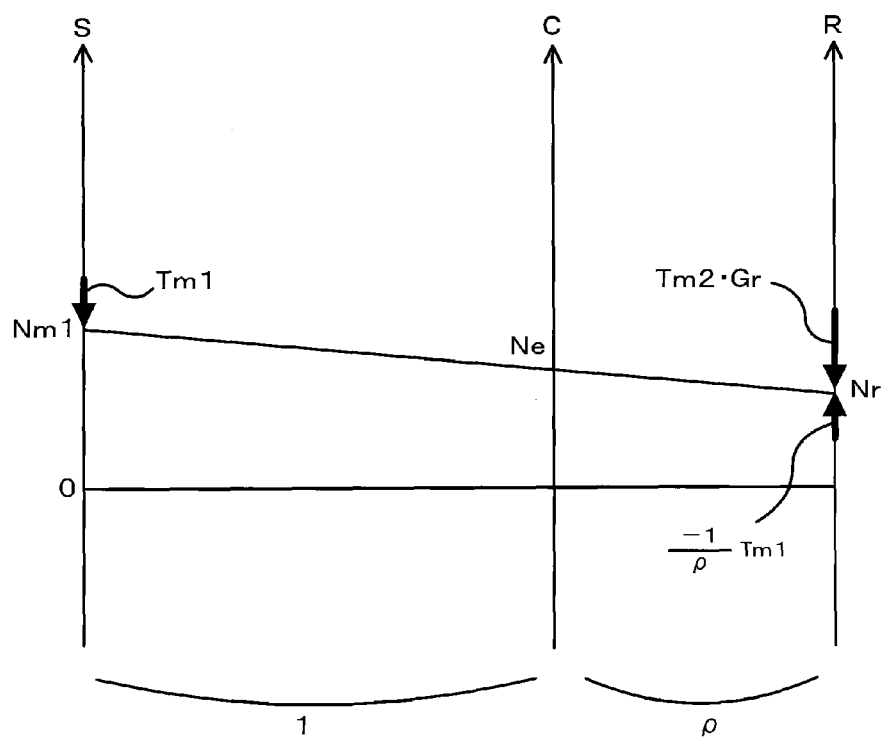
FIG. 6 is an alignment chart showing torque-rotation speed dynamics of respective rotational elements included in a power distribution integration mechanism 30.

A lower torque restriction Tmin and an upper torque restriction Tmax as allowable minimum and maximum torques output from the motor MG2 are calculated according to Equations (2) and (3) given below by dividing respective differences between the input limit Win or the output limit Wout of the battery 50 and power consumption (power generation) of the motor MG1, which is the product of the set torque command $Tm1^*$ and the current rotation speed Nm1 of the motor MG1, by the current rotation speed Nm2 of the motor MG2 (step S170). A tentative motor torque Tm2tmp to be output from the motor MG2 is then calculated from the braking torque demand Tr*, the torque command Tm1*, and a gear ratio ρ of the power distribution integration mechanism 30 according to Equation (4) given below (step S180). A torque command Tm2* of the motor MG2 is subsequently set by limiting the calculated tentative motor torque Tm2tmp by the lower and the upper torque restrictions Tmin and Tmax (step S190). When the torque command Tm1* of the motor MG1 is set to 0 at step S130, the torque command Tm1* equal to 0 is substituted into Equations (2) through (4) given above. Equation (4) is introduced from a dynamic relational expression of respective rotational elements included in the power distribution integration mechanism 30. FIG. 6 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by a gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Setting the torque command Tm2* of the motor MG2 in this manner restricts the braking torque demand Tr* to be output to the ring gear shaft 32a or the driveshaft in the range of the input limit Win and the output limit Wout of the battery 50.

$$Tmin=(Win-Tm1^* \cdot Nm1)/Nm2 \quad (2)$$

$$Tmax=(Wout-Tm1^* \cdot Nm1)/Nm2 \quad (3)$$

$$Tm2tmp=(Tr^*+Tm1^*/\rho)/Gr \quad (4)$$

A brake torque Tb* as a conversion from the torque to be applied by the hydraulic brake into the torque to be applied to the ring gear shaft 32a is set by subtracting the torque command Tm2* of the motor MG2 from the tentative motor torque Tm2tmp (step S200). The drive control routine sends the settings of the torque commands Tm1* and Tm2* of the motors MG1 and MG2 to the motor ECU 40 and the setting of the brake torque Tb* to the brake ECU 94 (step S210) and is terminated. When the tentative motor torque Tm2tmp is set directly to the torque command Tm2* of the motor MG2, the brake torque Tb* is set equal to 0. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. The brake ECU 94 receives the setting of the brake torque Tb* and controls the brake actuator 92 to adjust the hydraulic pressures of the brake wheel cylinders 96a to 96d and thereby ensure application of the brake torque Tb* as the converted torque to the ring gear shaft 32a. Such control enables the braking torque demand Tr* to be applied to the ring gear shaft 32a and thereby the hybrid vehicle 20.

While the hybrid electronic control unit 70 executes the drive control routine as discussed above, the engine ECU 24 performs the engine control according to the engine control routine as discussed below. In the engine control routine, the CPU 24a of the engine ECU 24 first inputs various data required for engine control, for example, the rotation speed adjustment flag F set by the drive control, the rotation speed Ne of the engine 22, and the vehicle speed V (step S300). The setting of the rotation speed adjustment flag F is received from the hybrid electronic control unit 70 by communication. The rotation speed Ne of the engine 22 is computed from the crank position detected by the crank position sensor 140. The vehicle speed V is detected by the vehicle speed sensor 88 and is received from the hybrid electronic control unit 70 by communication.

After the data input, the input rotation speed Ne of the engine 22 is compared with a preset reference rotation speed Nref1 (step S310). The reference rotation speed Nref1 is set to be slightly higher than a reference rotation speed Nref2, which is set as a rotation speed of the engine 22 to resume fuel injection to the engine 22 in a fuel cutoff state. For example, the reference rotation speed Nref2 and the reference rotation speed Nref1 are respectively equal to 1500 rpm and 1600 rpm. When the rotation speed Ne of the engine 22 is not lower than the reference rotation speed Nref1, the fuel injection from the fuel injection valve 126 is stopped to cut off the fuel supply to the engine 22 (step S320). The throttle motor 136 is then actuated to expand the throttle opening of the throttle valve 124 (to 30%, for example) over a specific throttle opening set in the state of a self-sustained operation of the engine 22 at the reference rotation speed Nref2 (step S330). The expansion of the throttle opening increases the air flow to the catalytic converter 134 and thereby effectively prevents the potential smell that is given by release of hydrogen sulfide converted from sulfur oxides carried on the catalyst in the catalytic converter 134 in the condition of insufficient amount of the air. The rotation speed Ne of the engine 22 is subsequently compared with the reference rotation speed Nref2 (step S350). When the rotation speed Ne of the engine 22 is not lower than the reference rotation speed Nref1, it is determined that the rotation speed Ne of the engine 22 is not lower than the reference rotation speed Nref2 by taking the relation of Nref1>Nref2 into consideration. The engine control routine is then terminated without further processing.

When the rotation speed Ne of the engine 22 decreases below the reference rotation speed Nref1, on the other hand, the throttle motor 136 is actuated to reduce the throttle opening of the throttle valve 124 to the specific throttle opening set in the state of the self-sustained operation of the engine 22 at the reference rotation speed Nref2 or a slightly greater throttle opening than this specific throttle opening (step S340). The rotation speed Ne of the engine 22 is then compared with the reference rotation speed Nref2 (step S350). Such reduction of the throttle opening decreases the amount of the air in an exhaust pipe and thereby effectively prevents the occurrence of potential after-fire. Immediately after the rotation speed Ne of the engine 22 decreases below the reference rotation speed Nref1, it is determined that the rotation speed Ne of the engine 22 is not lower than the reference rotation speed Nref2. The engine control routine is then terminated without further processing.

Upon determination that the rotation speed Ne of the engine 22 is lower than the reference rotation speed Nref2, a fuel injection base amount T0 is calculated from the amount of the intake air to attain a stoichiometric air-fuel ratio (step S360). The engine control routine subsequently identifies the setting of the rotation speed adjustment flag F and determines whether the vehicle speed V is not lower than a preset reference vehicle speed Vref (steps S370 and S380). The fuel injection base amount T0 is determined to attain the stoichiometric air-fuel ratio relative to the specific throttle opening set in the state of the self-sustained operation of the engine 22 at the reference rotation speed Nref2. In the condition of steady operation, the engine 22 idles at the reference rotation speed Nref2. The reference vehicle speed Vref is used as a criterion for determining whether there is a requirement or non-requirement for a quick start of the engine 22 to give a relatively large output from the engine 22 immediately after resumption of the fuel injection to the engine 22. The reference vehicle speed Vref is a relatively low vehicle speed, for example, 20 km/h or 30 km/h. Upon both identification of the rotation speed adjustment flag F equal to 1 and determination of the rotation speed V of not lower than the reference vehicle speed Vref, there is a requirement for a quick start of the engine 22. Such requirement is ascribed to the control of lowering the rotation speed Ne of the engine 22 by the motor MG1 and the relatively high level of the vehicle speed V. By taking into account this requirement, a fuel increase correction amount Ta is set to a relatively large correction amount T1 (step S390). A fuel injection amount T is calculated as a sum of the fuel injection base amount T0 and the fuel increase correction amount Ta (step S410). The engine control routine then opens the fuel injection valve 126 for a preset valve-opening time corresponding to the calculated fuel injection amount T (step S420) and is terminated. Such control ensures a quick start of the engine 22.

Upon identification of the rotation speed adjustment flag F equal to 0 or upon determination of the rotation speed V of lower than the reference vehicle speed Vref with identification of the rotation speed adjustment flag F equal to 1, there is non-requirement for a quick start of the engine 22. By taking into account this non-requirement, the fuel increase correction amount Ta is set to a correction amount T2 smaller than the correction amount T1 (step S400). The fuel injection amount T is calculated as the sum of the fuel injection base amount T0 and the fuel increase correction amount Ta (step S410). The engine control routine then opens the fuel injection valve 126 for a preset valve-opening time corresponding to the calculated fuel injection amount T (step S420) and is terminated. Setting the smaller correction amount T2 to the fuel increase correction amount Ta effectively prevents the potential after-fire that may occur on resumption of the fuel injection to the engine 22.

As described above, on the occasion of a cutoff of fuel supply to the engine 22 in the accelerator-off state, the hybrid vehicle 20 of the embodiment expands the throttle opening over the specific throttle opening set in the state of idling of the engine 22 at the reference rotation speed Nref2 and thereby increases the air flow to the exhaust pipe. The increased air flow effectively prevents the potential smell that is given by release of hydrogen sulfide converted from sulfur oxides carried on the catalyst in the catalytic converter 134 in the condition of insufficient amount of the air. Prior to resumption of the fuel injection to the engine 22, the hybrid vehicle 20 of the embodiment reduces the throttle opening to the specific throttle opening set in the state of idling of the engine 22 at the reference rotation speed Nref2. Such reduction of the throttle opening decreases the air flow to the exhaust pipe and thus effectively prevents the occurrence of potential after-fire. In the hybrid vehicle 20 of the embodiment, the fuel injection to the engine 22 is resumed with setting of the smaller correction amount T2 to the fuel increase correction amount Ta under no control of lowering the rotation speed of the engine 22 by the motor MG1 or under the condition of low vehicle speed with control of lowering the rotation speed of the engine 22 by the motor MG1. Such setting effectively prevents the potential after-fire that may occur on resumption of the fuel injection to the engine 22. The fuel injection to the engine 22 is resumed with setting of the relatively large correction amount T1 to the fuel increase correction amount Ta under the condition of medium or high vehicle speed with control of lowering the rotation speed of the engine 22 by the motor MG1. Such setting ensures a quick start of the engine 22 and enables the output of the engine 22 to be promptly used as the driving power.

Prior to resumption of the fuel injection to the engine 22, the hybrid vehicle 20 of the embodiment reduces the throttle opening to the specific throttle opening set in the state of idling of the engine 22 at the reference rotation speed Nref2. This is, however, not essential and the throttle opening may not be reduced prior to resumption of the fuel injection.

In the hybrid vehicle 20 of the embodiment, the fuel injection to the engine 22 is resumed with setting of the smaller correction amount T2 to the fuel increase correction amount Ta under no control of lowering the rotation speed of the engine 22 by the motor MG1 or under the condition of low vehicle speed with control of lowering the rotation speed of the engine 22 by the motor MG1. The fuel injection to the engine 22 maybe resumed with setting of the smaller correction amount T2 to the fuel increase correction amount Ta even under control of lowering the rotation speed of the engine 22 by the motor MG1. The fuel injection to the engine 22 may be resumed with setting of the smaller correction amount T2 to the fuel increase correction amount Ta even under the condition of medium or high vehicle speed.

Figure 7:
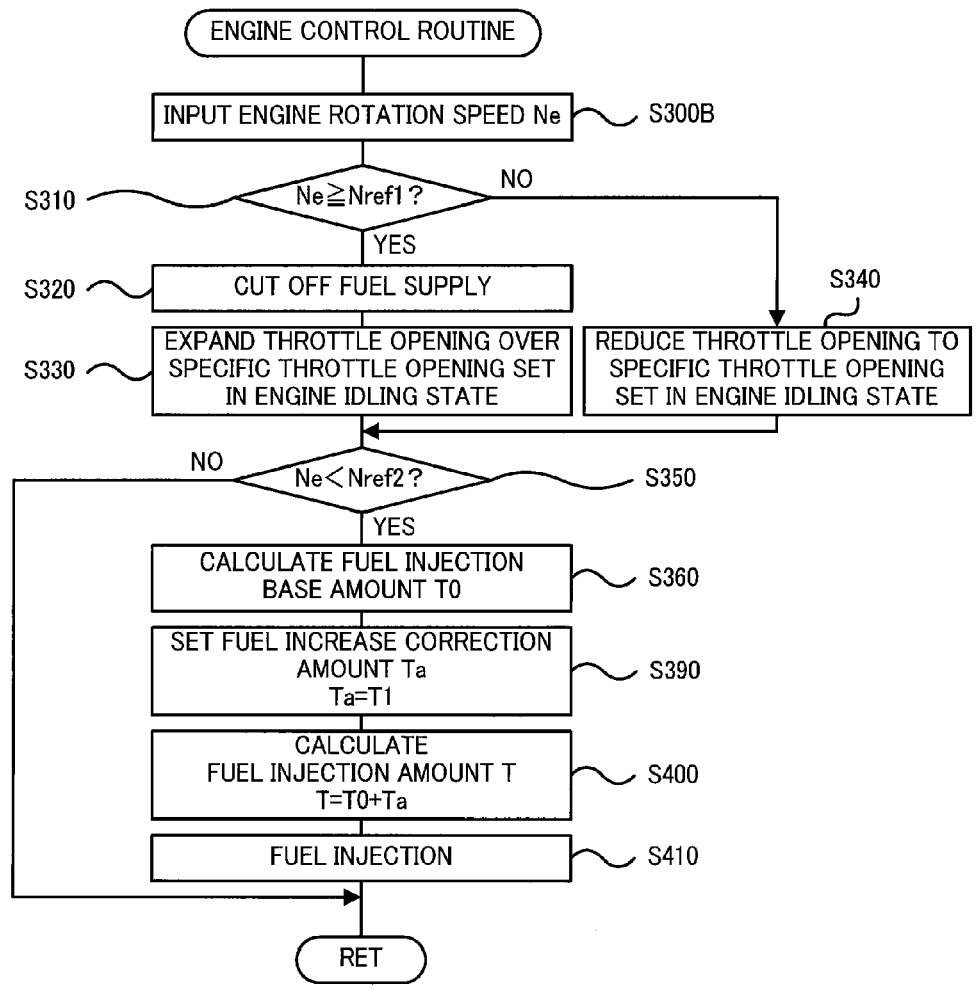
FIG. 7 is a flowchart showing an engine control routine in one modified structure.

In the hybrid vehicle 20 of the embodiment, prior to resumption of the fuel injection to the engine 22, the hybrid vehicle 20 of the embodiment reduces the throttle opening to the specific throttle opening set in the state of idling of the engine 22 at the reference rotation speed Nref2. The fuel injection to the engine 22 is resumed with setting of the smaller correction amount T2 to the fuel increase correction amount Ta under no control of lowering the rotation speed of the engine 22 by the motor MG1 or under the condition of low vehicle speed with control of lowering the rotation speed of the engine 22 by the motor MG1. One modified procedure may reduce the throttle opening to the specific throttle opening set in the state of idling of the engine 22 at the reference rotation speed Nref2 prior to resumption of the fuel injection but may resume the fuel injection to the engine 22 with unconditional setting of the relatively large correction amount T1 to the fuel increase correction amount Ta. An engine control routine of such modification is shown in the flowchart of FIG. 7. In the modified engine control routine of FIG. 7, only the rotation speed Ne of the engine 22 is input as the required data for control (step S300B). When the rotation speed Ne of the engine 22 decreases below the reference rotation speed Nref1, the throttle opening is reduced to the specific throttle opening set in the state of idling of the engine 22 at the reference rotation speed Nref2 (step S340). When the rotation speed Ne of the engine 22 decreases below the reference rotation speed Nref2, the modified engine control routine calculates the fuel injection base amount T0 from the amount of the intake air to attain the stoichiometric air-fuel ratio (step S360), sets the relatively large correction amount T1 to the fuel increase correction amount Ta (step S390), and calculates the fuel injection amount T as the sum of the fuel injection base amount T0 and the fuel increase correction amount Ta (step S400). The modified engine control routine then opens the fuel injection valve 126 for a preset valve-opening time corresponding to the calculated fuel injection amount T (step S410) and is terminated. This modified engine control also reduces the throttle opening to the specific throttle opening set in the state of idling of the engine 22 at the reference rotation speed Nref2 prior to resumption of the fuel injection to the engine 22. Such reduction of the throttle opening decreases the air flow to the exhaust pipe and thus effectively prevents the occurrence of potential after-fire. As long as the throttle opening is reduced to decrease the amount of the intake air to an engine prior to resumption of fuel injection to the engine, the technique of the invention is not restricted to the configuration of a hybrid vehicle but may be actualized by a power output apparatus including an internal combustion engine and a motor or by an internal combustion engine system including an internal combustion engine but not including a motor.

Figure 8:
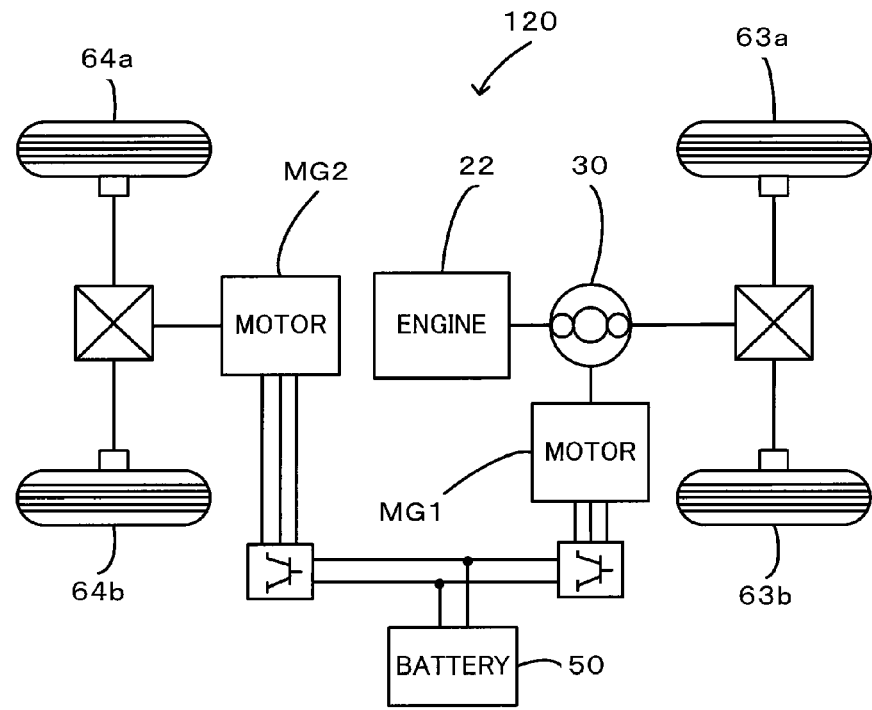
FIG. 8 schematically illustrates the configuration of a hybrid vehicle 120 in one modified structure.

In the hybrid vehicle 20 of the embodiment, the power of the motor MG2 is subjected to speed reduction by the reduction gear 35 and is output to the ring gear shaft 32a. The technique of the invention is, however, not restricted to the hybrid vehicle of this configuration but is also applicable to a hybrid vehicle 120 of a modified configuration shown in FIG. 8. In the hybrid vehicle 120 of FIG. 8, the power of the motor MG2 is connected to another axle (an axle linked with wheels 64a and 64b) that is different from an axle connecting with the ring gear shaft 32a (an axle linked with drive wheels 63a and 63b).

Figure 9:
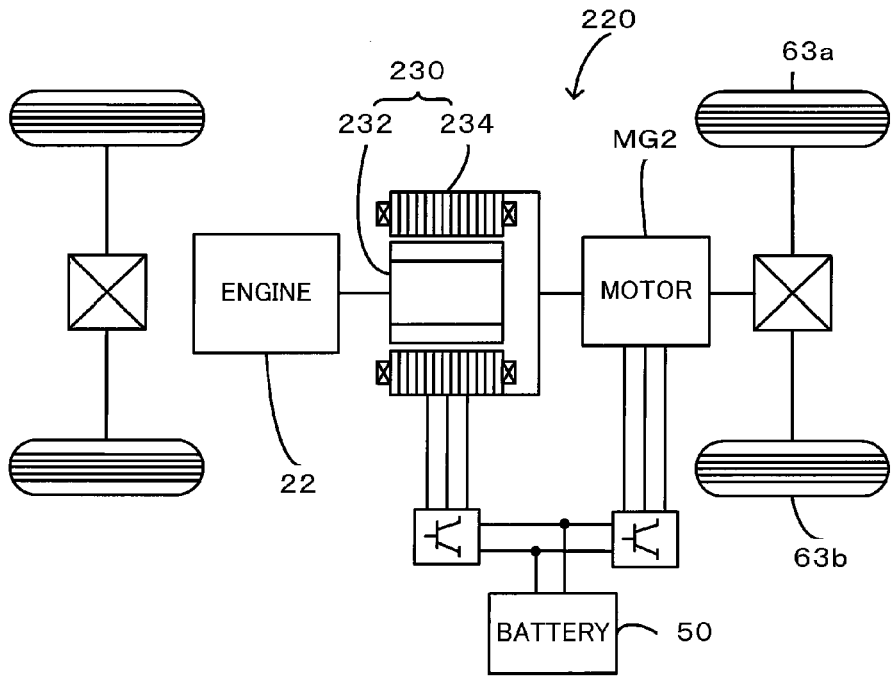
FIG. 9 schematically illustrates the configuration of a hybrid vehicle 220 in another modified structure

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is, however, not restricted to the hybrid vehicle of this configuration but is also applicable to a hybrid vehicle 220 of another modified configuration shown in FIG. 9. The hybrid vehicle 220 of FIG. 9 is equipped with a pair-rotor motor 230. The pair-rotor motor 230 includes an inner rotor 232 connected to the crankshaft 26 of the engine 22 and an outer rotor 234 connected to a driveshaft for outputting power to drive wheels 63a and 63b. The pair-rotor motor 230 transmits part of the output power of the engine 22 to the driveshaft, while converting the residual engine output power into electric power.

The above embodiment and modified examples describe the applications of the invention to the hybrid vehicles 20, 120, and 220. The technique of the invention may generally be actualized by a power output apparatus equipped with an internal combustion engine and a motor designed to adjust the rotation speed of the internal combustion engine, an internal combustion engine system including an internal combustion engine but not including a motor or a generator, as well as a control method of such a power output apparatus and a control method of such an internal combustion engine system.

The primary elements in the embodiment and its modified examples are mapped to the primary constituents in the claims of the invention as described below. The engine 22 equipped with the catalytic converter 134 filled with the catalyst having high oxygen storage capacity for converting toxic components of the exhaust gas, such as carbon monoxide (CO), hydrocarbons (HC), and nitrogen oxides (NOx), into harmless components in the embodiment is equivalent to the 'internal combustion engine' in the claims of the invention. The combination of the power distribution integration mechanism 30 with the motor MG1 in the embodiment corresponds to the 'rotation speed adjustment structure' in the claims of the invention. The accelerator pedal position sensor 84 in the embodiment corresponds to the 'accelerator-off detector' in the claims of the invention. The combination of the hybrid electronic control unit 70 executing the procedure of steps S120 to S160 in the drive control routine of FIG. 3 with the motor ECU 40 driving and controlling the motor MG1 in response to control signals from the hybrid electronic control unit 70 and the engine ECU 24 executing the engine control routine of FIG. 4 in the embodiment is equivalent to the 'controller' in the claims of the invention. The procedure of steps S120 to S160 in the drive control routine of FIG. 3 identifies the requirement or non-requirement for lowering the rotation speed of the engine 22 by the motor MG1 based on satisfaction or dissatisfaction of the specific condition in the accelerator-off state. The engine control routine of FIG. 4 expands the throttle opening over the specific throttle opening set in the state of idling of the engine 22 at the reference rotation speed Nref2 to cut off the fuel supply to the engine 22 in the accelerator-off state. The engine control routine of FIG. 4 reduces the throttle opening to the specific throttle opening set in the state of idling of the engine 22 at the reference rotation speed Nref2, prior to resumption of the fuel injection to the engine 22. The engine control routine of FIG. 4 resumes the fuel injection to the engine 22 with setting of the relatively large correction amount T1 to the fuel increase correction amount Ta under the condition of medium or high vehicle speed with control of lowering the rotation speed of the engine 22 by the motor MG1, while resuming the fuel injection to the engine 22 with setting of the correction amount T2 smaller than the correction amount T1 to the fuel increase correction amount Ta under no control of lowering the rotation speed of the engine 22 by the motor MG1 or under the condition of low vehicle speed with control of lowering the rotation speed of the engine 22 by the motor MG1. The vehicle speed sensor 88 of detecting the vehicle speed V in the embodiment corresponds to the 'rotation speed-reflecting physical quantity detector' in the claims of the invention. The motor MG2 in the embodiment corresponds to the 'motor' in the claims of the invention. The system of generating the hydraulic brake including the brake actuator 92, the brake ECU 94, and the brake wheel cylinders 96a through 96d in the embodiment is equivalent to the 'braking force application structure' in the claims of the invention. The hybrid electronic control unit 70 executing the procedure of step S110 to set the braking torque demand Tr* based on the brake pedal position BP and the vehicle speed V in the drive control routine of FIG. 3 in the embodiment is equivalent to the 'driving force demand setting module' in the claims of the invention. The power distribution integration mechanism 30 and the motor MG1 in the embodiment respectively correspond to the 'three shaft-type power input output structure' and the 'generator' in the claims of the invention. The pair-rotor motor 230 in the modified example of FIG. 9 also corresponds to the 'rotation speed adjustment structure' in the claims of the invention. The engine 22 equipped with the catalytic converter 134 filled with the catalyst having high oxygen storage capacity for converting toxic components of the exhaust gas, such as carbon monoxide (CO), hydrocarbons (HC), and nitrogen oxides (NOx), into harmless components in the embodiment is equivalent to the 'internal combustion engine' included in the internal combustion engine system in the claim of the invention. The accelerator pedal position sensor 84 in the embodiment corresponds to the 'accelerator-off detector' included in the internal combustion engine system in the claim of the invention. The engine ECU 24 executing the modified engine control routine of FIG. 7 is equivalent to the 'controller' included in the internal combustion engine system in the claim of the invention. The modified engine control routine of FIG. 7 expands the throttle opening over the specific throttle opening set in the state of idling of the engine 22 at the reference rotation speed Nref2 to cut off the fuel supply to the engine 22 in the accelerator-off state. The modified engine control routine of FIG. 7 reduces the throttle opening to the specific throttle opening set in the state of idling of the engine 22 at the reference rotation speed Nref2, prior to resumption of the fuel injection to the engine 22. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the present invention is preferably applied to the manufacturing industries of power output appratuses.

The invention claimed is:

1. A power output apparatus constructed to output power to a driveshaft, the power output apparatus comprising:
   an internal combustion engine connected with the driveshaft in such a manner as to be rotatable independently of the driveshaft and to transmit part of an output power to the driveshaft and equipped with a catalytic converter that is filled with a catalyst having high oxygen storage capacity to reduce the toxicity of exhaust gas;
   a rotation speed adjustment structure designed to adjust a rotation speed of an output shaft of the internal combustion engine;
   an accelerator-off detector designed to detect an accelerator-off state; and
   a controller configured to, under active rotation speed reduction control that controls the internal combustion engine and the rotation speed adjustment structure to lower the rotation speed of the output shaft of the internal combustion engine in the accelerator-off state detected by the accelerator-off detector, control the internal combustion engine to stop fuel injection to the internal combustion engine and to increase an amount of intake air to the internal combustion engine,
   on resumption of the fuel injection to the internal combustion engine after stopping the fuel injection, the controller controlling the internal combustion engine to resume the fuel injection to the internal combustion engine with a resumption-time fuel injection amount, which is increased from a standard fuel injection amount in a steady operation of the internal combustion engine relative to the amount of intake air to the internal combustion engine,
   under passive rotation speed reduction control that controls the internal combustion engine and the rotation speed adjustment structure to lower the rotation speed of the output shaft of the internal combustion engine without adjustment of the rotation speed of the output shaft of the internal combustion engine by the rotation speed adjustment structure in the accelerator-off state detected by the accelerator-off detector, the controller controlling the internal combustion engine to stop the fuel injection to the internal combustion engine and to increase the amount of intake air to the internal combustion engine,
   on resumption of the fuel injection to the internal combustion engine after stopping the fuel injection, the controller controlling the internal combustion engine to resume the fuel injection to the internal combustion engine with a smaller fuel injection amount than the resumption-time fuel injection amount.

2. The power output apparatus in accordance with claim 1, the power output apparatus further having:
   a rotation speed-reflecting physical amount detector designed to detect a physical amount reflecting a rotation speed of the driveshaft as a rotation-speed reflecting physical amount,
   wherein when the detected rotation speed-reflecting physical amount is not lower than a preset reference physical amount, on resumption of the fuel injection to the internal combustion engine even after the passive rotation speed reduction control, the controller controls the internal combustion engine to resume the fuel injection to the internal combustion engine with the resumption-time fuel injection amount.

3. The power output apparatus in accordance with claim 1, wherein prior to resumption of the fuel injection to the internal combustion engine, the controller controls the internal combustion engine to reduce the amount of intake air to the internal combustion engine.

4. The power output apparatus in accordance with claim 1, the power output apparatus further having:
   a motor arranged to input and output power from and to the driveshaft;
   a braking force application structure constructed to apply a braking force to the driveshaft; and
   a driving force demand setting module configured to set a driving force demand required for the driveshaft,
   wherein the controller controls the motor and the braking force application structure to output a driving force equivalent to the set driving force demand to the driveshaft.

5. The power output apparatus in accordance with claim 1, wherein the rotation speed adjustment structure is connected with the driveshaft and with the output shaft of the internal combustion engine to be rotatable independently of the driveshaft and outputs a torque to the output shaft of the internal combustion engine accompanied with output of a torque as a reactive force to the driveshaft, so as to adjust the rotation speed of the output shaft of the internal combustion engine.

6. The power output apparatus in accordance with claim 5, wherein the rotation speed adjustment structure includes:
   a three shaft-type power input output structure connected to three shafts, the driveshaft, the output shaft of the internal combustion engine, and a third shaft, and designed to input and output power to a residual shaft based on powers input from and output to any two shafts among the three shafts; and
   a generator arranged to input and output power from and to the third shaft.

7. The power output apparatus in accordance with claim 5, wherein the rotation speed adjustment structure includes:
   a pair-rotor motor configured to have a first rotor connected with the output shaft of the internal combustion engine and a second rotor connected with the driveshaft and to rotate by relative rotation of the first rotor to the second rotor.

* * * * *